(12) United States Patent
Jin

(10) Patent No.: US 10,563,668 B2
(45) Date of Patent: Feb. 18, 2020

(54) VARIABLE COMPRESSOR

(71) Applicants: HYUNDAI MOTOR COMPANY, Seoul (KR); KIA Motors Corporation, Seoul (KR)

(72) Inventor: Young Soo Jin, Suwon-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 186 days.

(21) Appl. No.: 15/817,614

(22) Filed: Nov. 20, 2017

(65) Prior Publication Data

US 2018/0258949 A1 Sep. 13, 2018

(30) Foreign Application Priority Data

Mar. 10, 2017 (KR) ........................ 10-2017-0030319

(51) Int. Cl.
| | |
|---|---|
| F04D 29/44 | (2006.01) |
| F04D 27/00 | (2006.01) |
| F04D 29/42 | (2006.01) |
| F04D 27/02 | (2006.01) |
| F04D 29/46 | (2006.01) |

(52) U.S. Cl.
CPC ......... *F04D 29/441* (2013.01); *F04D 27/002* (2013.01); *F04D 27/0207* (2013.01); *F04D 29/4206* (2013.01); *F04D 29/462* (2013.01); *Y02T 10/144* (2013.01)

(58) Field of Classification Search
CPC ...... F04D 29/464; F04D 29/441; F04D 29/46; F04D 29/462; F04D 27/002; F04D 27/0246; F04D 27/0207; F04D 27/0215
See application file for complete search history.

(56) References Cited

U.S. PATENT DOCUMENTS

| | | | | |
|---|---|---|---|---|
| 4,877,369 A | * | 10/1989 | Bandukwalla | ........ F01D 17/143 415/148 |
| 7,575,411 B2 | * | 8/2009 | Wood | ........................ F02C 6/12 415/58.4 |
| 8,740,175 B2 | * | 6/2014 | Kawamura | ........... B67C 3/2608 251/342 |
| 9,777,737 B2 | * | 10/2017 | Houst | ..................... F02B 37/22 |
| 9,845,723 B2 | * | 12/2017 | Mohtar | ................... F02B 37/22 |
| 9,951,793 B2 | * | 4/2018 | Lucas | ................... F04D 29/665 |
| 10,107,296 B2 | * | 10/2018 | Sun | ........................ F01D 17/148 |
| 10,107,297 B2 | * | 10/2018 | Kumar | ............... F04D 27/0246 |
| 2017/0191502 A1 | * | 7/2017 | Ozaki | ..................... F04D 17/10 |

FOREIGN PATENT DOCUMENTS

KR 20100054532 A 5/2010

* cited by examiner

*Primary Examiner* — Kenneth J Hansen
*Assistant Examiner* — Jackson N Gillenwaters
(74) *Attorney, Agent, or Firm* — McDonnell Boehnen Hulbert & Berghoff LLP

(57) ABSTRACT

The present disclosure relates to a variable compressor that may include a housing, a recirculation slit, a bladder, and a pressure providing device. The recirculation slit is formed in an inlet port of the compressor housing so as to discharge a portion of a fluid flowing into the inlet port to the outside of the inlet port and then reintroduce the portion of the fluid into the inlet port. The bladder is installed to expand and contract so as to change a cross-sectional area of the recirculation slit. The pressure providing device is disposed to expand and contract the bladder.

8 Claims, 4 Drawing Sheets

VARIABLE COMPRESSOR

CROSS REFERENCE TO RELATED APPLICATION

The present application claims priority to Korean Patent Application No. 10-2017-0030319, filed on Mar. 10, 2017, the entire contents of which is incorporated herein by reference.

TECHNICAL FIELD

The present disclosure relates to a variable compressor and, more specifically, to a structure of a compressor of a turbocharger or a similar supercharging device.

BACKGROUND

An engine may include a supercharging device, such as a turbocharger or a supercharger, in order to improve intake charging efficiency.

The supercharging device includes a compressor to compress air and supply the compressed air to a combustion chamber. The compressor may face various operating conditions, wherein surging or choking may become problematic.

The above information disclosed in this Background section is only for enhancement of understanding of the background of the present disclosure and should not be taken as acknowledgement that this information forms the prior art that is already known to a person skilled in the art.

SUMMARY

An aspect of the present disclosure is to provide a variable compressor that can vary air flow in the compressor, which is used in a turbocharger or the like, to reduce the occurrence of surging or choking, so as to expand the operational range of the turbocharger.

In accordance with an aspect of the present disclosure, a variable compressor of the present disclosure may include: a recirculation slit formed in an inlet port of a compressor housing so as to discharge a portion of a fluid flowing into the inlet port to an outside of the inlet port and then reintroduce the portion of the fluid into the inlet port; a bladder installed to expand and contract so as to change a cross-sectional area of the recirculation slit; and a pressure providing device disposed to expand and contract the bladder.

The compressor housing may include a housing body and a slit housing that is inserted in the housing body to form a part of the inlet port, the slit housing together with the housing body configuring the recirculation slit.

The slit housing may have a bladder insertion groove in which the bladder is inserted and fixed, the bladder insertion groove is formed at an end of the slit housing, which faces the housing body and forms the recirculation slit.

The slit housing may include a channel forming part, which has one end forming the recirculation slit and has an outer peripheral surface spaced apart from the housing body to allow a fluid, which has been discharged through the recirculation slit, to flow.

The slit housing may include multiple support ribs protruding from the outer peripheral surface of the channel forming part so that the channel forming part is stably supported in a state in which the channel forming part is spaced apart from the housing body.

The other end of the channel forming part may include a flange, which prevents flowing of the fluid having been discharged through the recirculation slit, has a portion having an enlarged outer diameter to fix the slit housing to the housing body, and is in contact with and fixed to the housing body.

A return slit may be formed between the channel forming part and the flange so that a fluid, which has flowed between the housing body and the outer peripheral surface of the channel forming part, can be reintroduced into the channel forming part through the return slit.

The bladder may be made of a circular elastic material.

The bladder may include a supply nipple that can supply a pressurized fluid to the bladder.

The bladder is expanded by the pressurized fluid provided through the supply nipple in a center axial direction of a circular shape formed by the bladder.

The compressor housing may include a housing body and a slit housing that is inserted in the housing body to form a part of the inlet port and together with the housing body configures the recirculation slit.

The slit housing may have a bladder insertion groove in which the bladder is inserted and fixed, the bladder insertion groove being formed at an end of the slit housing, which faces the housing body and forms the recirculation slit.

The bladder insertion groove may surround the inner peripheral surface and outer peripheral surface of the bladder and be open only in a direction toward the recirculation slit, so as to allow the bladder to expand in the center axial direction of a circular shape formed by the bladder.

The bladder may have an expansion part and a flat-sectional part integrally formed thereon, wherein the expansion part is expanded by the supply of the pressurized fluid and the flat-sectional part moves according to the expansion or contraction of the expansion part to change a cross-sectional area of the recirculation slit.

The expansion part may be formed to be positioned in the bladder insertion groove in a state where the flat-sectional part completely closes the recirculation slit.

The pressure providing device may include: an air tank; a pressure adjustment valve configured to adjust the pressure of air from the air tank; and a control valve configured to allow or block supply of air, which has been provided through the pressure adjustment valve, to the bladder or to discharge the air.

A variable compressor proposed by the present disclosure can vary air flow in the compressor, which is used in a turbocharger or the like, to reduce the occurrence of surging or choking, so as to expand the operation range of the turbocharger.

Further, the variable compressor can control the operation thereof according to traveling conditions of a vehicle, thereby improving an output performance of the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
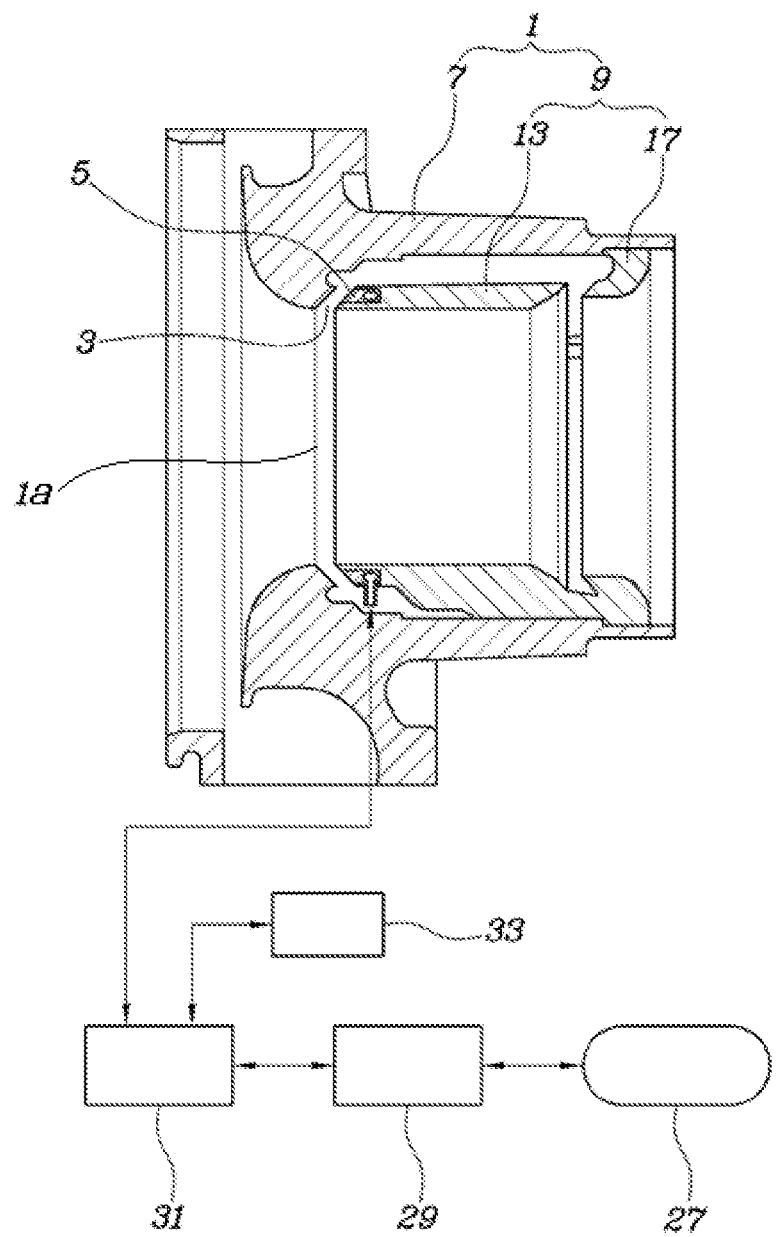
FIG. 1 illustrates the configuration of a variable compressor according to the present disclosure.
Figure 2:
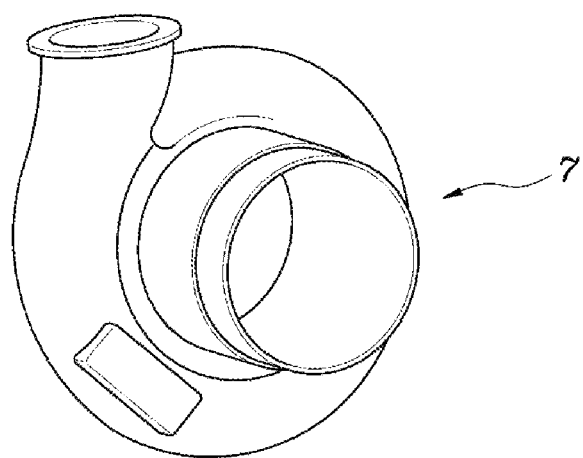
FIG. 2 illustrates the exterior of a housing body in FIG. 1.
Figure 3:
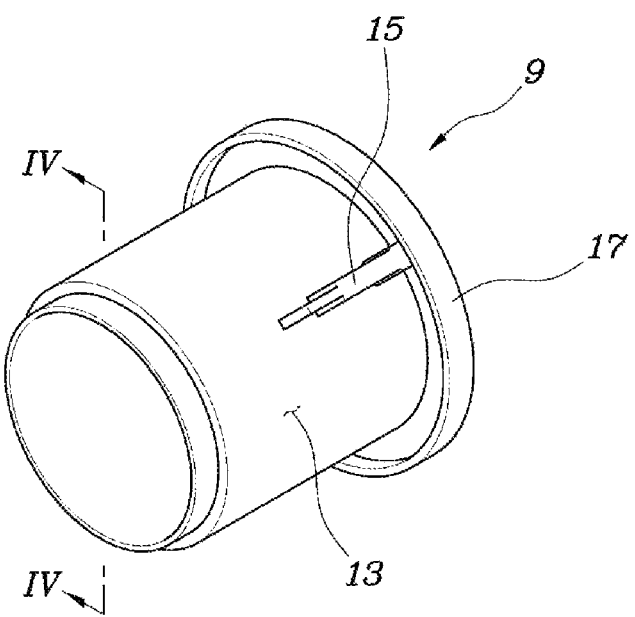
FIG. 3 illustrates the exterior of a slit housing in FIG. 1.
Figure 4:
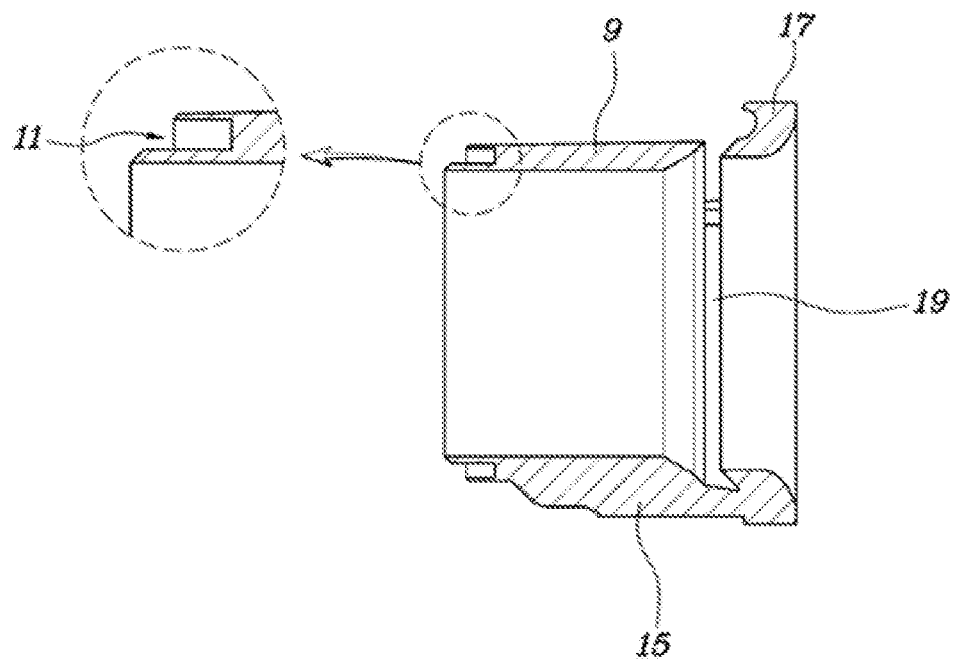
FIG. 4 is a cross-sectional view taken along line IV-IV of FIG. 3.
Figure 5:
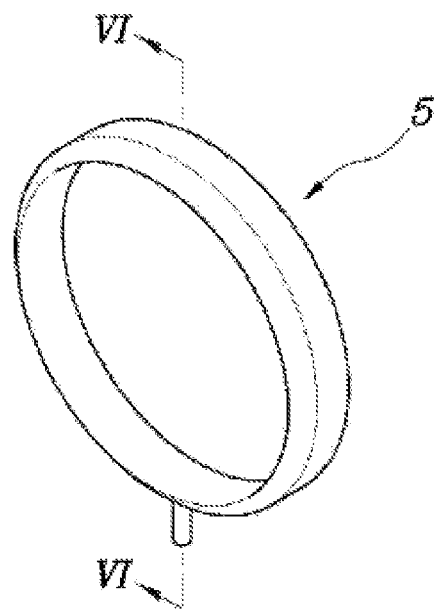
FIG. 5 illustrates the exterior of a bladder in FIG. 1.
Figure 6:
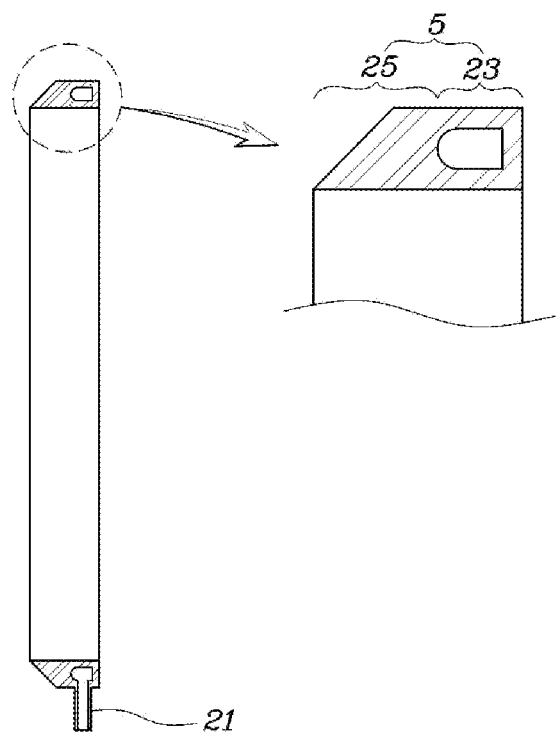
FIG. 6 is a cross-sectional view taken along line VI-VI of FIG. 5.

Referring to FIGS. 1 to 7, an embodiment of a variable compressor of the present disclosure includes: a recirculation slit 3 formed in an inlet port 1a of a compressor housing 1 so as to discharge a portion of a fluid flowing into the inlet port 1a to the outside of the inlet port 1a and then reintroduce the portion of the fluid into the inlet port 1a; a bladder 5 installed to expand and contract so as to change a cross-sectional area of the recirculation slit 3; and a pressure providing device disposed to expand and contract the bladder 5.

Specifically, the compressor of the present disclosure includes the recirculation slit 3 arranged in the inlet port 1a of the compressor housing 1. The compressor allows the cross-sectional area of the recirculation slit 3 to be changed by the bladder 5. Therefore, the compressor can prevent or reduce surging and choking, which may occur in the compressor, thereby expanding the operational range of the compressor.

For reference, the compressor may be coupled with a turbine to configure a turbocharger so as to be used in a vehicle. Otherwise, the compressor can be used as a compressor for a supercharger. In these cases, the expansion of the operational range of the compressor as described above can contribute to improving the output and fuel efficiency of the vehicle.

In the present embodiment, the compressor housing 1 includes a housing body 7 and a slit housing 9, which is inserted in the housing body 7 to form a part of the inlet port 1a and which together with the housing body 7 configures the recirculation slit 3.

In other words, the present embodiment enables the recirculation slit 3 to be easily implemented by the slit housing 9 inserted in the housing body 7.

The slit housing 9 has a bladder insertion groove 11 in which the bladder 5 is inserted and fixed, the bladder insertion groove 11 being formed at one end of the slit housing 9, which faces the housing body 7 and forms the recirculation slit 3. Therefore, due to the position of the slit housing 9, the cross-sectional area of the recirculation slit 3 can be adjusted.

The slit housing 9 includes a channel forming part 13, which has one end forming the recirculation slit 3 and has an outer peripheral surface spaced apart from the housing body 7 to allow a fluid, which has been discharged through the recirculation slit 3, to flow. The slit housing 9 includes multiple support ribs 15 protruding from the outer peripheral surface of the channel forming part 13. Due to the ribs, the channel forming part 13 is stably supported in a state in which the channel forming part 13 is spaced apart from the housing body 7.

The other end of the channel forming part 13 includes a flange 17, which prevents flowing of the fluid having been discharged through the recirculation slit 3, has a portion having an enlarged outer diameter to fix the slit housing 9 to the housing body 7, and is in contact with and fixed to the housing body 7. A return slit 19 is formed between the channel forming part 13 and the flange 17 so that a fluid, which has flowed between the housing body 7 and the outer peripheral surface of the channel forming part 13, can be reintroduced into the channel forming part 13.

Therefore, the slit housing 9 is fixed to and supported by the housing body 7 by means of the support ribs 15 and the flange 17 and forms a channel through which a portion of a fluid being introduced into the compressor through the recirculation slit 3 can be discharged from the inlet port 1a and then recirculated into the inlet port 1a.

In the present embodiment, the bladder 5 may be made of a circular elastic material. The bladder 5 may include a supply nipple 21, which can supply a pressurized fluid to the bladder 5. The direction in which the bladder 5 is expanded by the pressurized fluid provided through the supply nipple 21 may be in a center axial direction of a circular shape formed by the bladder 5.

Further, the bladder insertion groove 11 surrounds the inner peripheral surface and the outer peripheral surface of the bladder 5 and is open only in a direction toward the recirculation slit 3, so as to allow the bladder 5 to expand in the center axial direction of a circular shape formed by the bladder 5.

The bladder 5 has an expansion part 23 and a flat-sectional part 25 integrally formed thereon, wherein the expansion part 23 is expanded by the supply of the pressurized fluid and the flat-sectional part 25 moves according to the expansion or contraction of the expansion part 23 to change the cross-sectional area of the recirculation slit 3. The expansion part 23 is formed to be positioned in the bladder insertion groove 11 even in a state where the flat-sectional part 25 completely closes the recirculation slit 3.

Therefore, when a pressurized fluid is supplied to the bladder 5, the expansion part 23 expands only in the bladder insertion groove 11 and, due to the expansion of the expansion part 23, the flat-sectional part 25 moves along the center axial direction of a circular shape formed by the bladder 5 to change the cross-sectional area of the recirculation slit 3.

In the present embodiment, the pressure providing device includes: an air tank 27; a pressure adjustment valve 29 configured to adjust the pressure of air from the air tank 27; and a control valve 31 configured to allow or block supply of air, which has been provided through the pressure adjustment valve 29, to the bladder 5 or to discharge the air.

Therefore, in the present embodiment, the pressurized fluid supplied to the bladder 5 may be compressed air supplied from the control valve 31.

Of course, a pressurized oil may be used as the pressurized fluid of the bladder 5. In this case, the pressure providing device will be configured as a hydraulic device.

The variable compressor of the present disclosure configured as described above controls the control valve 31 to enable the bladder 5 to change the cross-sectional area of the recirculation slit 3, in order to regulate or prevent the occurrence of surging or choking, and thus has an expanded operational range.

When the variable compressor of the present disclosure is applied to a turbocharger of a vehicle, the variable compressor allows a controller 33, which receives vehicle engine operation information and information related to the traveling of various kinds of vehicles, to adjust the control valve 31 according to a traveling situation of the vehicle. This promotes the improvement of fuel efficiency and output of the vehicle resulting from the performance improvement of the compressor.

Figure 7:
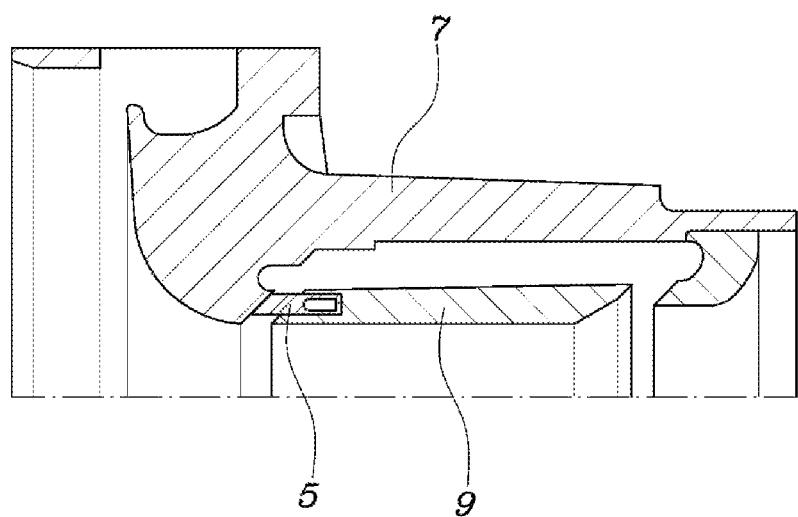
FIG. 7 is a cross-sectional view depicting a state in which the bladder completely closes a recirculation slit.

For example, when the variable compressor of the present disclosure is used in a vehicle, the controller 33 controls the control valve 31 to expand the bladder 5 so as to close the recirculation slit 3 as shown in FIG. 7, in a low-load or low-speed operation immediately after engine start. In a high-load or high-speed operation of an engine, the controller 33 contracts the bladder 5 as much as possible so as to completely open the recirculation slit 3 as shown in FIG. 1.

The prevention of surging or choking according to the adjusting of the cross-sectional area of the recirculation slit 3 is a well-known conventional technology and a detailed description thereof will be thus omitted.

The present disclosure has been made with reference to only particular embodiments. However, it would be obvious to a person skilled in the art that various modifications and changes are possible within the technical idea of the present disclosure, provided by the accompanying claims.

What is claimed is:

1. A variable compressor comprising:
   a recirculation slit formed in an inlet port of a compressor housing so as to discharge a portion of a fluid flowing into the inlet port to an outside of the inlet port and then reintroduce the portion of the fluid into the inlet port;
   a bladder installed to expand and contract so as to change a cross-sectional area of the recirculation slit; and
   a pressure providing device disposed to expand and contract the bladder;
   wherein the compressor housing comprises: a housing body; and a slit housing that is inserted in the housing body to form a part of the inlet port, the slit housing together with the housing body configuring the recirculation slit; and
   wherein the slit housing has a bladder insertion groove in which the bladder is inserted and fixed, the bladder insertion groove is formed at an end of the slit housing, which faces the housing body and forms the recirculation slit.

2. The variable compressor of claim 1, wherein the slit housing comprises: a channel forming part, which has one end forming the recirculation slit and has an outer peripheral surface spaced apart from the housing body to allow the fluid, which has been discharged through the recirculation slit, to flow; and multiple support ribs protruding from the outer peripheral surface of the channel forming part so that the channel forming part is stably supported in a state in which the channel forming part is spaced apart from the body.

3. The variable compressor of claim 2, wherein an other end of the channel forming part comprises a flange, which prevents flowing of the fluid having been discharged through the recirculation slit, has a portion having an enlarged outer diameter to fix the slit housing to the housing body, and is in contact with and fixed to the housing body.

4. The variable compressor of claim 3, wherein a return slit is formed between the channel forming part and the flange so that a fluid, which has flowed between the housing body and the outer peripheral surface of the channel forming part, can be reintroduced into the channel forming part through the return slit.

5. The variable compressor of claim 1, wherein the bladder is made of a circular elastic material; the bladder comprises a supply nipple that can supply a pressurized fluid to the bladder; and the bladder is expanded by the pressurized fluid provided through the supply nipple in a center axial direction of a circular shape formed by the bladder.

6. The variable compressor of claim 5, wherein the bladder insertion groove surrounds an inner peripheral surface and an outer peripheral surface of the bladder and is open only in a direction toward the recirculation slit, so as to allow the bladder to expand in the center axial direction of a circular shape formed by the bladder.

7. The variable compressor of claim 6, wherein the bladder has an expansion part and a flat-sectional part integrally formed thereon, the expansion part being expanded by the supply of the pressurized fluid, and the flat-sectional part moving according to the expansion or contraction of the expansion part to change a cross-sectional area of the recirculation slit; and the expansion part is formed to be positioned in the bladder insertion groove in a state where the flat-sectional part completely closes the recirculation slit.

8. The variable compressor of claim 1, wherein the pressure providing device comprises: an air tank; a pressure adjustment valve configured to adjust a pressure of air from the air tank; and a control valve configured to allow or block supply of air, which has been provided through the pressure adjustment valve, to the bladder or to discharge the air.

* * * * *